United States Patent
Jain et al.

(10) Patent No.: US 8,606,930 B1
(45) Date of Patent: Dec. 10, 2013

(54) MANAGING CONNECTIONS FOR A MEMORY CONSTRAINED PROXY SERVER

(75) Inventors: Sushant Jain, Sunnyvale, CA (US); Roberto Javier Peon, Palo Alto, CA (US); James Angus Morrison, San Francisco, CA (US)

(73) Assignee: Google Inc., Mountain View, CA (US)

( * ) Notice: Subject to any disclaimer, the term of this patent is extended or adjusted under 35 U.S.C. 154(b) by 779 days.

(21) Appl. No.: 12/784,609

(22) Filed: May 21, 2010

(51) Int. Cl.
*G06F 15/16* (2006.01)

(52) U.S. Cl.
USPC .......................................... 709/227; 709/229

(58) Field of Classification Search
USPC .................................. 709/227, 229
See application file for complete search history.

(56) References Cited

U.S. PATENT DOCUMENTS

| | | | | |
|---|---|---|---|---|
| 5,958,053 | A * | 9/1999 | Denker ............................. | 726/1 |
| 6,014,727 | A * | 1/2000 | Creemer ....................... | 711/118 |
| 2002/0055980 | A1 * | 5/2002 | Goddard ....................... | 709/217 |
| 2003/0050974 | A1 * | 3/2003 | Mani-Meitav et al. ........ | 709/203 |
| 2004/0044771 | A1 * | 3/2004 | Allred et al. .................. | 709/227 |
| 2004/0088413 | A1 * | 5/2004 | Bhogi et al. .................. | 709/226 |
| 2005/0038801 | A1 * | 2/2005 | Colrain et al. ................ | 707/100 |
| 2006/0020598 | A1 * | 1/2006 | Shoolman et al. ................ | 707/8 |
| 2006/0026169 | A1 * | 2/2006 | Pasqua ............................ | 707/10 |
| 2008/0228923 | A1 * | 9/2008 | Chidambaran et al. ........ | 709/227 |

* cited by examiner

*Primary Examiner* — Boris Gorney
(74) *Attorney, Agent, or Firm* — Lerner, David, Littenberg, Krumholz & Mentlik, LLP

(57) ABSTRACT

A content distribution network includes a proxy server in communication with one or more content distribution servers. The proxy server services connections to the content distribution servers from one or more client devices. The proxy server responds to changes in memory utilization for servicing the connections of the client devices. To respond to the changes in memory utilization, the proxy server may include a connection manager, a process manager, and a memory manager. The memory manager performs one or more operations to determine a memory pressure amount. The memory pressure amount may represent a ratio of the amount of memory allocated by the proxy server to the amount of memory available to the proxy server. Based on monitoring the memory pressure amount, the memory manager adjusts a connection serviceable amount that informs the connection manager of the number of potential connections the proxy server may service.

30 Claims, 8 Drawing Sheets

MANAGING CONNECTIONS FOR A MEMORY CONSTRAINED PROXY SERVER

BACKGROUND

A content distributor employs one or more servers to distribute content over the Internet to an end user operating a client device. The servers may be networked together to more efficiently provide content to the end user. The content to be distributed may include a document or resource of information suitable for the World Wide Web and accessible through a web browser, a multimedia file for playback or display on the client device of the end user, or any other type of electronic information. As examples, the content may be a web page, a video file, an audio file, or any other type of electronic media.

The content distributor may use a content-distribution network to distribute content to end users. Generally, a content-distribution network is a system of computers that are networked together across the Internet and cooperate transparently for distributing content.

In configuring the content-distribution network, the content for distribution may reside on one or more servers. The content distributor may use one or more proxy servers for accepting incoming connections from the end users and/or for distributing or servicing incoming connections.

However, for a single proxy server, or even multiple proxy servers, managing hundreds of thousands of incoming connections is a challenging task. Since each connection requires memory from the proxy server to maintain, the proxy server may quickly run out of memory and may not be able to maintain all of the connections. One approach for managing incoming connections is for the proxy server to place a queue limit on the number of incoming connections waiting for service and/or distribution. In this first approach, the proxy server may set a limit that only 5, 100, or 1,000 incoming connections may be queued. A second approach that the proxy server may employ is limiting the amount of time that any one incoming connection may be idle. In this second approach, the proxy server may set a limit that an incoming connection may only be idle for a fixed amount of time. After this fixed amount of time has expired, the proxy server may then terminate, or drop, the connection.

Both of the aforementioned approaches require that the proxy server set, beforehand, a relatively unknown limit on either the number of queued connections or the amount of time that a connection may be idle. Neither of these approaches adequately account for the actual performance of the proxy server.

BRIEF SUMMARY

In one embodiment, a system for dynamically managing user connections in a computer system is provided. The system may include a memory storage device having a connection manager and a memory manager and a processor. The processor may be operative to manage the operations of the connection manager and the memory manager.

The connection manager may be operative to establish a connection serviceable amount that represents a number of serviceable connections in a computer system and, receive a first connection request for establishing a connection to a computer system.

The memory manager may be operative to establish an allocated memory amount that represents a first amount of memory allocated by the computer system, establish a memory threshold amount that represents a threshold amount of memory allocated by the computer system, determine whether the connection manager is operative to accept a second connection request by comparing the allocated memory amount with the memory threshold amount, and adjust the connection serviceable amount based on the comparing of the allocated memory amount with the memory threshold amount to obtain an adjusted connection serviceable amount In one alternative, the memory manager may be further operative to determine at a predetermined time interval whether the connection manager is operative to accept the second connection request. In addition, when the memory manager receives a memory allocation request to allocate memory for the second connection request, the memory manager may be further operative to determine whether the connection manager is operative to accept the second connection request.

In another alternative, the memory storage device may further include a connection queue operative to store connections that are waiting to be serviced and the connection manager may be further operative to adjust the size of the connection queue based on the adjusted connection serviceable amount. In addition, the size of the connection queue may be decreased when the allocated memory amount is greater than the memory threshold amount. Moreover, the size of the connection queue may be increased when the allocated memory amount is less than the memory threshold amount.

In yet a further alternative, the connection manager may be operative to monitor the connection serviceable amount and transmit a memory allocation request to allocate memory for servicing connections to the computer system when a number of connections requesting service exceeds the connection serviceable amount.

In another alternative, an adjusted connection serviceable amount that is less than the connection serviceable amount may be obtained when the allocated memory amount is greater than the memory threshold amount.

In yet another alternative, the memory manager may be further operative to establish a connection increase amount that represents an amount by which to increase the connection serviceable amount, and an adjusted connection serviceable amount that represents the connection serviceable amount increased by the connection increase amount may be obtained when the allocated memory amount is less than the memory threshold amount.

Additionally, in a further alternative, the memory manager may be further operative to establish an upper limit amount that represents an upper limit on the number of connections serviceable by the computer system, determine a memory pressure amount that represents a ratio of a second amount of memory allocated by the computer system to an amount of memory available to the computer system, determine a memory pressure threshold amount that represents a threshold amount of memory pressure, and assign the memory pressure amount as the allocated memory amount when the memory manager establishes the allocated memory amount. In addition, the comparison of the allocated memory amount with the memory threshold amount may include comparing the memory pressure amount with the memory pressure threshold amount. Furthermore, the adjusted connection serviceable amount may be assigned the upper limit amount when the memory pressure amount is less than the memory pressure threshold amount.

In a yet further alternative, the memory manager may be further operative to establish a connection increase amount that represents an amount by which to increase the connection serviceable amount, determine a memory pressure amount that represents a ratio of a second amount of memory allocated by the computer system to an amount of memory available to the computer system, determine a memory pressure threshold amount that represents a threshold amount of memory pressure, and assign the memory pressure amount as the allocated memory amount when the memory manager establishes the allocated memory amount. Additionally, the comparison of the allocated memory amount with the memory threshold amount may include comparing the memory pressure amount with the memory pressure threshold amount, and comparing the memory pressure amount with the memory threshold amount. Moreover, the adjusted connection serviceable amount may be the connection serviceable amount increased by the connection increase amount when the memory pressure amount is greater than the memory pressure threshold amount and the memory pressure amount is less than the memory threshold amount.

In another embodiment, a method for dynamically managing user connections in a computer system is provided. The method may include establishing a connection serviceable amount that represents a number of serviceable connections in a computer system, establishing an allocated memory amount that represents a first amount of memory allocated by the computer system, and establishing a memory threshold amount that represents a threshold amount of memory allocated by the computer system. The method may also include receiving a first connection request for establishing a connection to a computer system, determining whether to accept a second connection request by comparing the allocated memory amount with the memory threshold amount, and, adjusting the connection serviceable amount based on the comparing of the allocated memory amount with the memory threshold amount to obtain an adjusted connection serviceable amount.

In another alternative, the method may include determining whether to accept the second connection request occurs at a predetermined time interval. In a further aspect, the method may include determining whether to accept the second connection request when a memory allocation request is received to allocate memory for the second connection request.

In yet another alternative, the method may include establishing a connection queue operative to store connections that are waiting to be serviced and adjusting the size of the connection queue based on the adjusted connection serviceable amount. In addition, the method may include decreasing the size of the connection queue when the allocated memory amount is greater than the memory threshold amount.

In a further alternative, the method may include increasing the size of the connection queue when the allocated memory amount is less than the memory threshold amount.

In yet a further alternative, the method may include monitoring the connection serviceable amount and transmitting a memory allocation request to allocate memory for servicing connections to the computer system when a number of connections requesting service exceeds the connection serviceable amount.

In another alternative, the method may include obtaining an adjusted connection serviceable amount that is less than the connection serviceable amount when the allocated memory amount is greater than the memory threshold amount.

In yet another alternative, the method may include establishing a connection increase amount that represents an amount by which to increase the connection serviceable amount and obtaining an adjusted connection serviceable amount that represents the connection serviceable amount increased by the connection increase amount when the allocated memory amount is less than the memory threshold amount.

In a further alternative, the method may include establishing an upper limit amount that represents an upper limit on the number of connections serviceable by the computer system, determining a memory pressure amount that represents a ratio of a second amount of memory allocated by the computer system to an amount of memory available to the computer system, determining a memory pressure threshold amount that represents a threshold amount of memory pressure, and assigning the memory pressure amount as the allocated memory amount when the memory manager establishes the allocated memory amount. Moreover, according to the method, the comparison of the allocated memory amount with the memory threshold amount may include comparing the memory pressure amount with the memory pressure threshold amount and the adjusted connection serviceable amount may be assigned the upper limit amount when the memory pressure amount is less than the memory pressure threshold amount.

In yet a further alternative, the method may include establishing a connection increase amount that represents an amount by which to increase the connection serviceable amount, determining a memory pressure amount that represents a ratio of a second amount of memory allocated by the computer system to an amount of memory available to the computer system, determining a memory pressure threshold amount that represents a threshold amount of memory pressure, and assigning the memory pressure amount as the allocated memory amount when the memory manager establishes the allocated memory amount. Moreover, according to the method, the comparison of the allocated memory amount with the memory threshold amount may include comparing the memory pressure amount with the memory pressure threshold amount and comparing the memory pressure amount with the memory threshold amount. Furthermore, according to the method, the adjusted connection serviceable amount may be the connection serviceable amount increased by the connection increase amount when the memory pressure amount is greater than the memory pressure threshold amount and the memory pressure amount is less than the memory threshold amount.

In another embodiment, a computer-readable medium is provided. The computer-readable medium may have computer-executable instructions stored thereon, where, when the computer-executable instructions are executed by a processor, the computer-executable instructions cause a proxy server to perform an embodiment of the aforementioned method.

DETAILED DESCRIPTION

Figure 1:
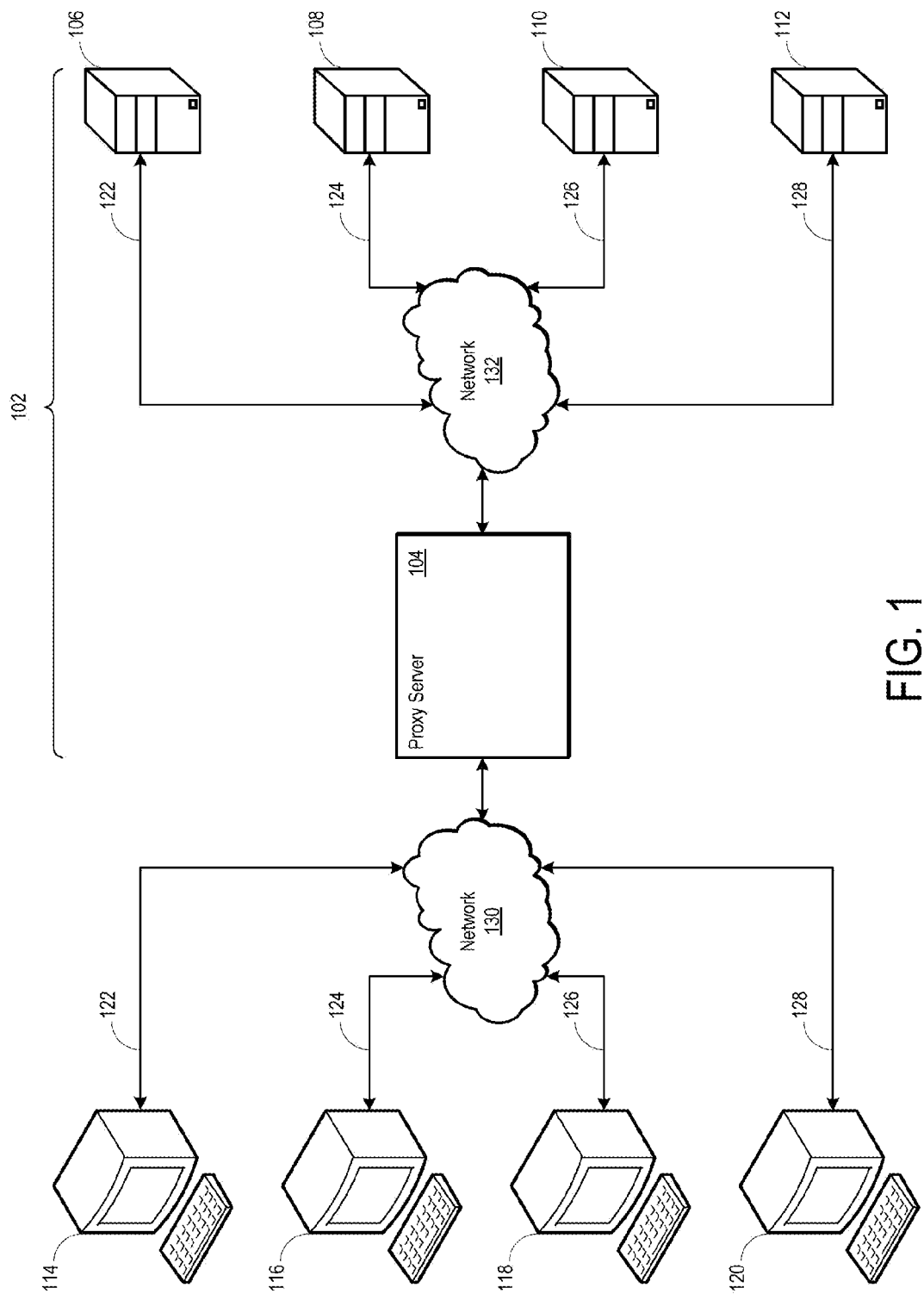
FIG. 1 illustrates one example of a content distribution network using a proxy server in communication with multiple client devices.

FIG. 1 illustrates one example of a content distribution network 102 having a proxy server 104 in communication with one or more client devices 114-120 via a first network 130. The proxy server may also be in communication with one or more content distribution servers 106-112 via a second network 132.

In one implementation, the content distribution network 102 includes the proxy server and the one or more content distribution servers 106-112. However, in an alternative implementation, the content distribution network 102 may also include one or more client devices 114-120. The content distributed by the one or more content distribution servers 106-112 may be any type of electronic content such as Internet webpages, multimedia files, electronic documents, or any other type of electronic content now known or later developed.

The first network 130 and second network 132 may be any combination of networks. For example, the first 130 and second networks 132 may each be a Wide Area Network ("WAN"), such as the Internet; a Local Area Network ("LAN"); a Personal Area Network ("PAN"), or, a combination of WANs, LANs, and PANs. Moreover, the first network 130 and second network 132 may involve the use of one or more wired protocols, such as the Simple Object Access Protocol ("SOAP"); wireless protocols, such as 802.11a/b/g/n, Bluetooth, or WiMAX; transport protocols, such as the Transmission Control Protocol ("TCP") or User Datagram Protocol ("UDP"); an Internet layer protocol, such as the Internet Protocol ("IP"); application-level protocols, such as the Hypertext Transfer Protocol ("HTTP"), a combination of any of the aforementioned protocols, or any other type of network protocol now known or later developed.

One or more of the client devices 114-120 may be in communication with the one or more content distribution servers 106-112 by way of the proxy server 104. The client devices 114-120 may be any type of client device or combination of client devices. For example, the first client device 114 may be a desktop computer, the second client device 116 may be a mobile phone, the third client device 118 may be a laptop computer, and the fourth client device 120 may be a netbook computer. Moreover, the client devices 114-120 may directly or indirectly communicate with one another via the first network 130.

The client devices 114-120 may communicate with the content distribution servers 106-112 via the proxy server 104 and through the first network 130 and the second network 132. For example, the first client device 114 may communicate with the first content distribution server 106, the second client device 116 may communicate with the second content distribution server 108, and so on. Alternatively, one or more client devices 114-120 may communicate with one or more of the content distribution servers 106-112. For example, the first client device 114 may communicate with both the first content distribution server 106 and the second content distribution server 108; or, the first client device 114 may communicate with all four of the content distribution servers 106-112. Other combinations of communication arrangements are also possible.

In one implementation, the client devices 114-120 establish corresponding connections 122-128 with the proxy server 104 for communicating with the one or more content distribution servers 106-112. The connections 122-128 may involve the use of one or more of the protocols discussed above, a combination of any of the aforementioned protocols, or any other type of network protocol now known or later developed.

In FIG. 1, each of the client devices 114-120 has a corresponding connection with the content distribution servers 106-112. For example, the first client device 114 has first connection 122 with the first content distribution server 106. Similarly, the second client device 116 has first connection 124 with the second content distribution server 108. However, the client devices 114-120 may have more than one connection with one or more of the content distribution servers 106-112. For example, it is possible that the first client device 114 has several connections with the first content distribution server 106 and several connections with the second content distribution server 108. Other arrangements of connections between the client devices 114-120 and the content distribution servers 106-112 are also possible.

The proxy server 104 manages and services the connections 122-128 to be made with the content distribution servers 106-112. For example, the proxy server 104 may initially accept a connection from one or more of the client devices 114-120 and then determine whether the proxy server 104 has the resources available to service the connection. In general, servicing the connection may include placing the client device associated with the connection in communication with a content distribution server to receive content requested by a user of the client device. Should the proxy server 104 determine that there are resources available to service the connection, the proxy server 104 may then service the connection.

However, there may be instances where the proxy server 104 has limited resources to service the connection of the client device. For example, where the proxy server 104 is on limited resources, the proxy server 104 may place the connection in a connection queue to be serviced when additional resources become available. Because a number of client devices 114-120 may be requesting content from the content distribution system 102, the proxy server 104 may be managing multiple connections 122-128 with multiple content distribution servers 106-112. Accordingly, the proxy server 104 may exhaust available resources while servicing connections. When resources become available, the proxy server 104 may then resume servicing connections. As described below with reference to FIGS. 2-5, the proxy server 104 may manage connections 122-128 by placing the connections in an "IDLE" state and temporarily storing the connection in a connection queue and/or terminating the connection.

Figure 2:
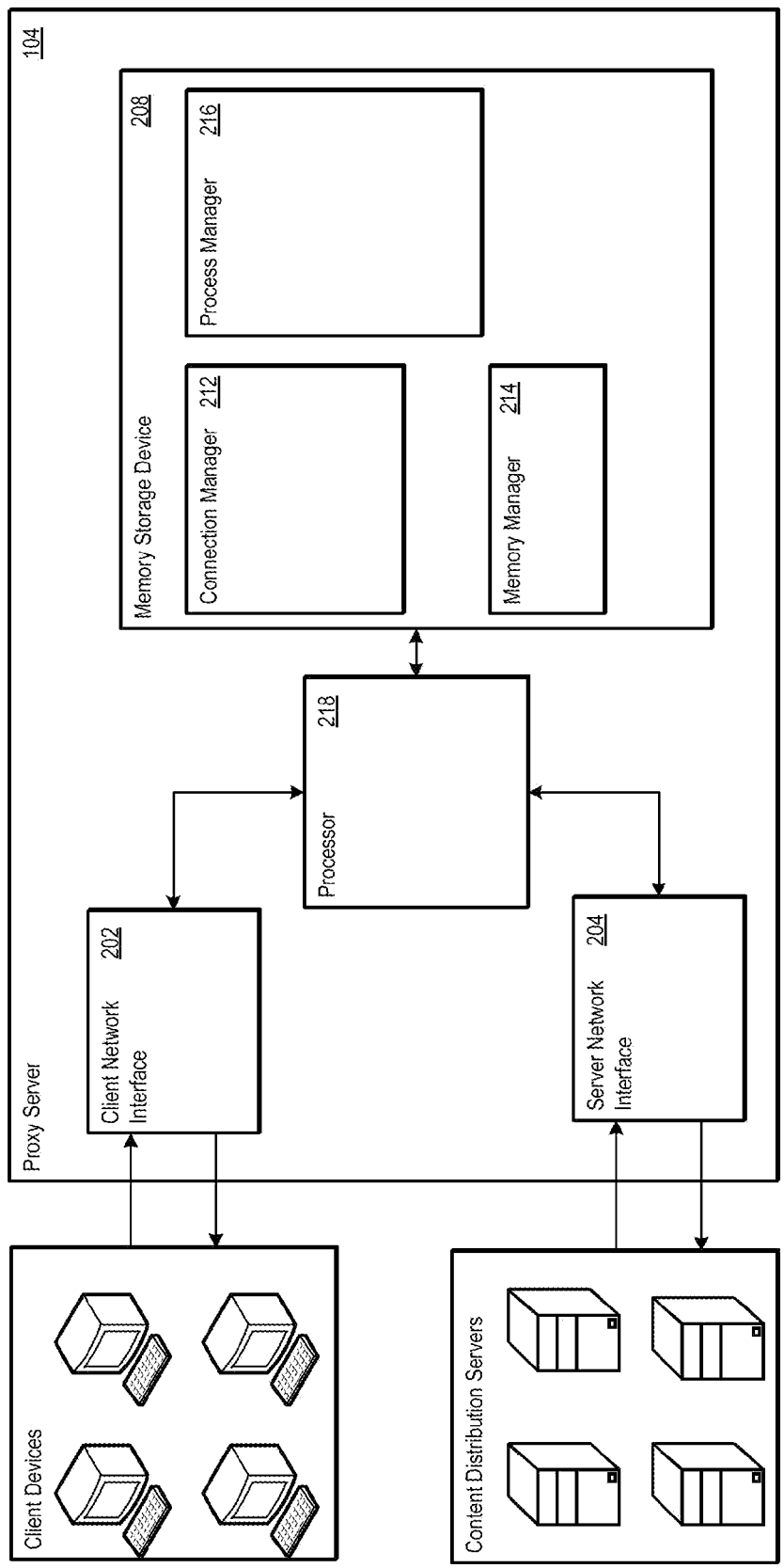
FIG. 2 illustrates one example of the proxy server from FIG. 1.

FIG. 2 illustrates one example of the proxy server 104. In one implementation, the proxy server 104 includes a client network interface 202, a server network interface 204, a processor 206, and a memory storage device 208. The memory storage device 208 may include one or more managers for manage and servicing the connections with the proxy server 104, such as a connection manager 212, a process manager 216, and a memory manager 214. In one implementation, the proxy server 104 is implemented as a web server, such as Apache, which is available from the Apache Software Foundation, located in Los Angeles, Calif., running in an operating system, such as Linux. Alternatively, the proxy server 104 may be implemented as a forward caching proxy, such as Squid, or a reverse caching proxy, such as Varnish.

Although FIG. 2 shows a single proxy server 104 in communication with client devices and content distribution servers, the proxy server 104 may be implemented using more than one proxy server, such as through a distributed network.

The client network interface 202 is operative to receive requests for content from the one or more client devices and to transmit the content from the one or more content distribution servers to the client devices. The client network interface 202 may be a wired network interface, a wireless network interface, or a combination of wired network interfaces and wireless network interfaces. In addition, the client network interface 202 may comprise more than one network interface.

Similarly, the server network interface 204 is operative to transmit the requests for content to the content distribution servers and to receive content from the content distribution servers for transmission to the client devices. The server network interface 204 may be a wired network interface, a wireless network interface, or a combination of wired network interfaces and wireless network interfaces. In addition, the server network interface 204 may comprise more than one network interface. Although FIG. 2 shows the server network interface 204 separate from the client network interface 202, the client network interface 202 and the server network interface 204 may be implemented as a single network interface or across multiple network interfaces as well.

The memory storage device 208 is operative to store managers that manage the connections established with the proxy server 104 and the resources available to the proxy server 104. As mentioned above, the memory storage device 208 may store a connection manager 212, a memory manager 214, and a process manager 216. Each of the managers 212-216 may be implemented as a single manager, different managers, or a combination of managers. Moreover, one or more of the managers 212-216 may reside on one or more proxy servers. Alternative managers are also possible.

The memory storage device 208 may be any type of computer-readable medium. For example, the memory storage device 208 may be Random Access Memory ("RAM"), Read-Only Memory ("ROM"), a magnetic disk, such as a hard drive, solid-state memory, an optical disc, such as a CD-ROM, Blu-Ray, or DVD, a combination of computer-readable mediums, or any other type of computer-readable medium now known or later developed.

The processor 218 is operative to manage the operations of the connection manager 212, the process manager 216, and the memory manager 214. Moreover, the processor 218 may handle the processing of the network connections from the client network interface 202 and the server network interface 204. Furthermore, the processor 218 may handle the transfer of data and requests from or to the managers 212-216. As an example, the processor 218 may handle the execution of a request for the allocation of memory from the memory manager 214. As another example, the processor 218 may handle the transfer of a connection from the client network interface 202 to the connection manager 212. Other types of operations performable or handled by the processor 218 are also possible.

The proxy server 104 may be configured with a set of instructions for managing connections based on a performance criterion. For example, the proxy server 104 may be configured to manage connections based on available or unallocated memory. In one implementation, the proxy server 104 is configured to limit the number of connections with the proxy server 104 when free memory or unallocated memory is low. In this first implementation, the proxy server 104 may increase the number of permissible connections as the amount of free memory or unallocated memory increases. Accordingly, the proxy server 104 manages connections in response to the amount of free memory or unallocated memory available to the proxy server 104. In another implementation, the proxy server 104 may limit the connections based on an amount of allocated memory. In this alternative implementation, the proxy server 104 may limit the number of connections as more memory is allocated and similarly, increase the number of permissible connections as the amount of allocated memory decreases.

However, the proxy server 104 may also be configured to manage connections based on another criterion. For example, the proxy server 104 may be configured to manage connections based on the number of available processors, the number of processor cycles, any other performance criterion, or combinations thereof.

The set of instructions below provide one example of configuring the proxy server 104 to manage connections based on unallocated memory. However, as discussed above, the instructions below may be adapted to configure the proxy server 104 to manage connections based on allocated memory, the number of processors, the number of processor cycles, or other performance criterion.

Begin Sample Instructions

1. Determine a memory pressure amount, where the memory pressure amount may be determined by dividing the amount of memory allocated by the proxy server by the amount of memory available to the proxy server. The amount of allocated memory and the amount of available memory may be represented in absolute terms, such as megabytes, gigabytes, or other memory measurement, or in relative terms, such as 50% of the memory capacity, 30% of the memory capacity, or other relative terms;
2. Determine a memory threshold amount that represents a threshold amount of memory allocated by the proxy server. As with the allocated memory amount of the amount of available memory, the memory threshold amount may be represented in absolute or relative terms;
3. Determine a current connection serviceable amount that represents a current number of connections that are serviceable by the proxy server;
4. Determine a current connection queue amount that represents a current number of connections that are in a connection queue waiting to be serviced by the proxy server;
5. Compare the memory pressure amount with the memory threshold amount. Here:
   a. If the memory pressure amount is less than a predetermined amount, e.g., 90%, of the memory threshold amount, then set the connection serviceable amount to a predetermined upper limit amount (e.g., 100, 1000, or unlimited) of connections to obtain an adjusted connection serviceable amount;
   b. If the memory pressure amount is less than the memory threshold amount but greater than the predetermined amount of the memory threshold amount from 5(a), then increase the connection serviceable amount by a connection increase amount, such as by one connection to obtain an adjusted connection serviceable amount.
6. However, if the memory pressure amount is greater than the memory threshold amount, then decrease the connection serviceable amount by a connection decrease amount. The connection decrease amount may be represented by dividing the memory threshold amount by the memory pressure amount, and then multiplying this result by the current connection queue amount.

7. Additionally, if the adjusted connection serviceable amount is greater than the connection serviceable amount, then reset the adjusted connection serviceable amount to the connection serviceable amount.

End Sample Instructions

One or more of the managers 212-216 may be configured to implement one or more aspects of the above set of instructions. For example, the memory manager 214 may be operative to manage the memory of the proxy server 104. In one implementation, the memory manager 216 obtains the amount of total memory for the proxy server 104. The memory manager 216 may obtain the total memory for the proxy server 104 by making one or more operating system calls via the processor 218. The memory manager 214 may then determine the memory threshold amount based on the total memory for the proxy server 104. The memory threshold amount may be determined automatically as a percentage of the total memory for the proxy server 104, such as 10%, 20%, or other percentage. Alternatively, the memory threshold amount may be determined as a percentage of allocated or unallocated memory from the total memory. In yet another implementation, the memory manager 214 may accept user input to establish the memory threshold amount.

The memory manager 214 may be further operative to determine an allocated memory amount of the proxy server 104. The memory manager 214 may determine the allocated memory amount based on memory allocated by system processes, such as the memory used by an operating system, running services, running daemons, running threads, or other system processes, and memory allocated by user processes, such as running applications.

Moreover, the memory manager 214 may query the connection manager 212 and the process manager 216 to determine an amount of memory allocated by the connection manager 212 and the process manager 216 in queuing and servicing connections. The memory manager 214 may combine the allocated memory amounts to determine an overall allocated memory amount. By subtracting the overall allocated memory amount from the total memory, the memory manager 214 may determine an unallocated memory amount. Alternatively, the memory manager 214 may query the operating system to determine the unallocated memory amount. In yet another implementation, the memory manager 214 may track the allocated memory amount and the unallocated memory amount as various processes allocate and/or reassign (e.g., freeing) memory of the proxy server 104. In tracking the allocated and unallocated memory amounts, the memory manager 214 may further maintain a granular account of which processes, connections, managers, etc. have been allocated memory amounts of the proxy server 104. In this implementation, the memory manager 214 may leverage a table, array, database, or other organizational structure to maintain a granular account of the allocated memory amounts.

In addition to the memory manager 214, the connection manager 212 may be configured to implement one or more aspects of the aforementioned instructions. In one implementation, the connection manager 212 is operative to determine the connection serviceable amount. The connection manager 212 may determine the connection serviceable amount arbitrarily or based on a memory amount, such as the unallocated memory amount, the allocated memory amount, or a combination thereof. Alternatively, the connection manager 212 may receive user input that initially defines the connection serviceable amount.

The connection manager 212 may also monitor a connection queue amount. As explained with reference to FIG. 3A, the connection manager 212 may include a connection queue 302 for queuing connections to be serviced. The connection queue 302 may have a queue limit for the number of possible connections that may be queued. The connection manager 212 may be operative to establish the queue limit of the connection queue 302 based on the connection serviceable amount and, as the memory manager 214 adjusts the connection serviceable amount, adjust the queue limit to correspond to the adjusted connection serviceable amount.

The connection manager 212 may queue a connection under a variety of scenarios. In one scenario, the connection changes from an active state, in which to content or data is being transmitted, to an idle state, in which little to no data or content is being transmitted. In this scenario, the connection manager 212 may queue a connection in order to have other connections serviced. In another scenario, the connection manager 212 may determine that the proxy server 104 is unable to service the connection, but that the proxy server 104 has resources available to service the connection at a future time. In this alternative scenario, the connection manager 212 may queue the connection until the proxy server 104 has the resources available to service the connection.

In queuing or servicing a connection, the connection manager 212 may query the memory manager 214, the process manager 216, or other component, to determine whether the proxy server 104 has the resources to queue or service a connection. For example, when the connection manager 212 receives a connection request from the processor 218, the connection manager 212 may query the process manager 216 to determine whether the process manager 216 has an available process to service the connection request. Where the process manager 216 indicates that there is no available process, the connection manager 212 may attempt to queue the connection.

In queuing the connection, the connection manager 212 may query the connection queue to determine whether the queuing of the connection would exceed the connection queue limit. Should the queuing of the connection not exceed the connection queue limit, the connection manager 212 may queue the connection. However, where the queuing of the connection would exceed the connection queue limit, the connection manager 212 may transmit a memory allocation request to the memory manager 214 to allocate additional memory from the unallocated memory of the proxy server 104. The request for the allocation of additional memory may cause the memory manager 214 to perform one or more of the instructions discussed above for increasing the queue limit of the connection queue.

As described above, a successful allocation of additional memory may increase the connection serviceable amount, which may, in turn, increase the connection queue limit. However, an unsuccessful allocation of additional memory may cause the connection manager 212 to reject the connection. In an alternative implementation, the memory manager 212 may undertake the operation of determining whether to increase or decrease the connection serviceable amount automatically. For example, the memory manager 212 may be operative to determine at a predetermined time interval whether the connection manager is operative to accept additional connections. The predetermined time interval may be any measurement of time, such as 2.5 seconds, 10 seconds, 1 millisecond, or any other measurement of time.

In addition to the connection manager 212, the process manager 216 may be configured to implement one or more of the aforementioned instructions. For example, the process manager 216 may be operative to service the connections managed by the connection manager 212. In one implementation, the process manager 216 is a daemon running on the proxy server 104, and the daemon includes one or more threads and/or processes for servicing the connections. As a thread and/or process of the process manager 216 completes the servicing of a connection, the process manager 216 may request another connection from the connection manager 212. Alternatively, if the connection being serviced by the process manager 216 becomes idle or unresponsive, the process manager 216 may transfer the idle and/or unresponsive connection to the connection manager 212 to wait until the connection becomes active. It is possible that a connection is alternately transferred between the connection manager 212 and the process manager 216 during the lifetime of the connection.

Figure 3B:
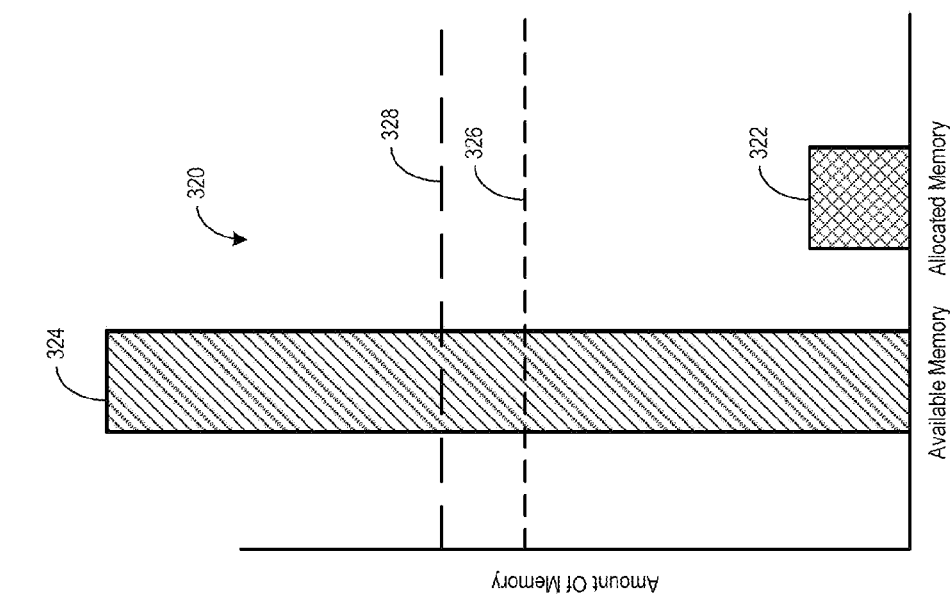
FIG. 3B illustrates a graph showing the memory usage of the proxy server in FIG. 3A.
Figure 3A:
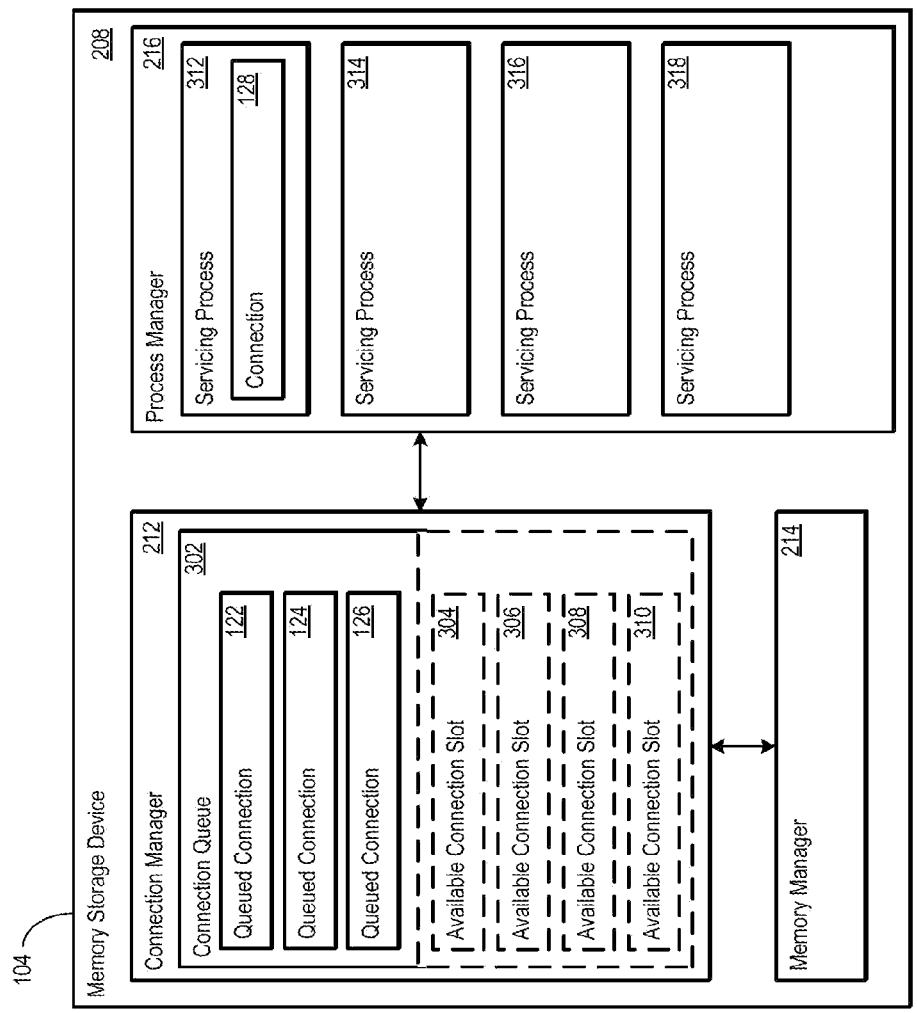
FIG. 3A illustrates one example of a proxy server configured to accept a predetermined upper limit amount of incoming connections.

FIG. 3A illustrates one example of the proxy server 104 configured to accept a predetermined upper limit amount of connections. As shown in FIG. 3A, the connection manager 212 includes the connection queue 302 that has queued a number of the connections 122-126 from FIG. 1. As previously discussed above the connection manager 212 may establish an initial connection queue limit based on the connection serviceable amount determined by the memory manager 214 or the connection manager 212. FIG. 3A also shows that the process manager 216 includes a number of servicing processes and/or threads 312-318 for servicing connections. In the example shown in FIG. 3A, at least one servicing process 312 is servicing the connection 128 from FIG. 1. As the process manager 216 includes a number of freely available servicing processes 314-316, the connection manager 212 may transfer one or more of the queued connections 122-126 from the connection queue 302 to the process manager 216 for servicing.

After the predetermined time interval, or when an additional connection is established with the proxy server 104, the connection manager 212 and/or the memory manager 214 may determine whether to increase the connection queue limit amount vis-à-vis the connection serviceable amount. FIG. 3B illustrates a graph 320 showing the memory usage of the proxy server 104 illustrated in FIG. 3A when the predetermined time interval lapses or when an additional connection is established with the proxy server 104.

The graph 320 depicts an allocated memory amount 322, an available (e.g., free) memory amount 324, a memory threshold amount 328 and a memory pressure threshold amount 326. As discussed in the aforementioned exemplary set of instructions, the memory pressure threshold amount 326 may be established as 90% of the memory threshold amount 328, but other memory pressure threshold amounts are also possible. For example, the memory pressure threshold amount may be 40% of the memory threshold amount, 50% of the memory threshold amount, or any other fraction of the memory threshold amount 328. While the available memory amount 324 and the allocated memory amount 322 may not be directly comparable with the memory threshold amount 328 and/or the memory pressure threshold amount 326, it is evident from the graph 320 that the memory pressure amount, which is the allocated memory amount 322 divided by the available memory amount 324, would be significantly less than the memory pressure threshold amount 326.

In the situation depicted in FIGS. 3A-3B, the memory manager 214 may increase the connection serviceable amount by a predetermined increase amount or, alternatively, may place no restrictions on the connection serviceable amount. The changes to the connection serviceable amount are reflected in the increase in the connection queue limit with the addition of available connection queue slots 304-310. Where there are no restrictions placed on the connection serviceable amount, the proxy server 104 may continuously accept incoming connections until a predetermined condition occurs, such as when the memory pressure amount exceeds the memory pressure threshold amount 326 or is slightly below the memory threshold amount 328. This situation is discussed in FIGS. 4A-4B below.

Figure 4B:
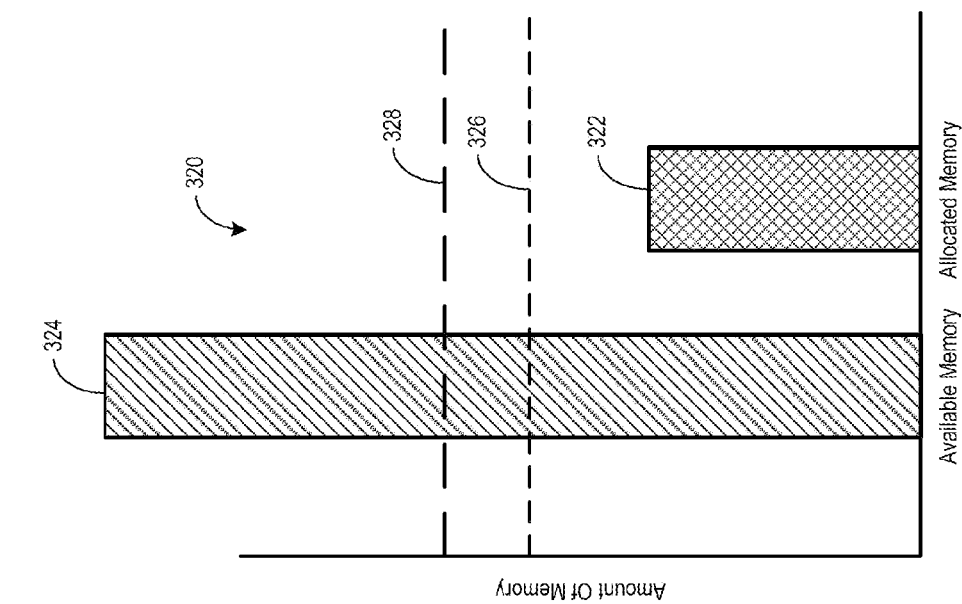
FIG. 4B illustrates a graph showing the memory usage of the proxy server in FIG. 4A.
Figure 4A:
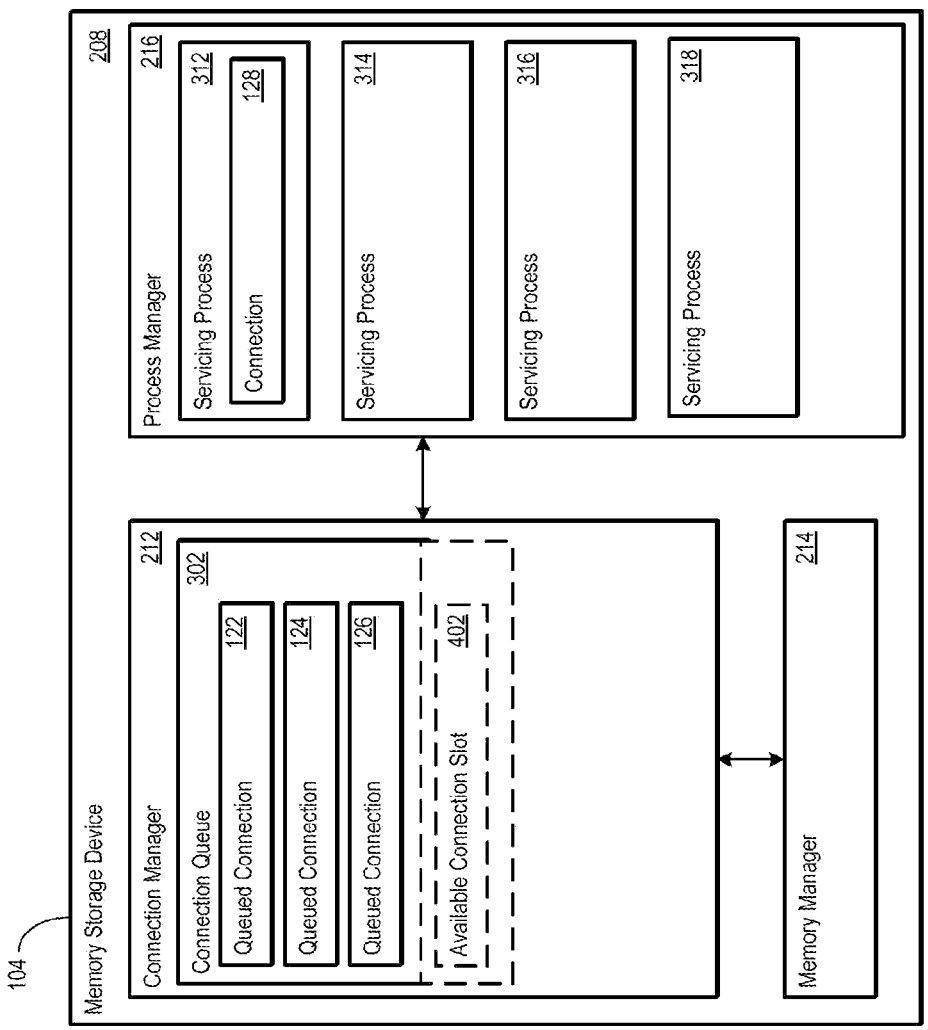
FIG. 4A illustrates one example of a proxy server configured to accept a predetermined number of incoming connections.

FIG. 4A illustrates one example of the proxy server 104 configured to accept a predetermined number of incoming connections. The memory usage of the proxy server 104 is shown in FIG. 4B. FIG. 4B shows that the available memory amount 324 is about two-thirds greater than that of the allocated memory amount 322. If the memory pressure threshold amount 326 is estimated at 90% of the memory threshold amount 328, then, based on the amounts shown in FIG. 4B, the memory pressure amount exceeds the memory pressure threshold amount but does not exceed the memory threshold amount 328. In this situation, where the memory pressure amount exceeds the memory pressure threshold amount but does not exceed the memory threshold amount 328, the proxy server 104, by way of the memory manager 214 and/or the connection manager 212, may increase the connection serviceable amount by an connection increase amount, such as by one connection. The one connection increase is reflected in the connection queue of FIG. 4A, which shows that the connection queue limit of the connection queue has been increased by one available connection slot 402. Although the connection queue limit has been increased by one connection queue slot, other connection increase amounts are also possible, such as a two connection increase amount, a three connection increase amounts or other amounts. By incrementally increasing the connection serviceable amount, the proxy server 104 retains control over the amount of memory used by servicing one or more connections. Hence, the increases in the connection serviceable amount more accurately reflect the performance and capabilities of the proxy server 104.

Figure 5B:
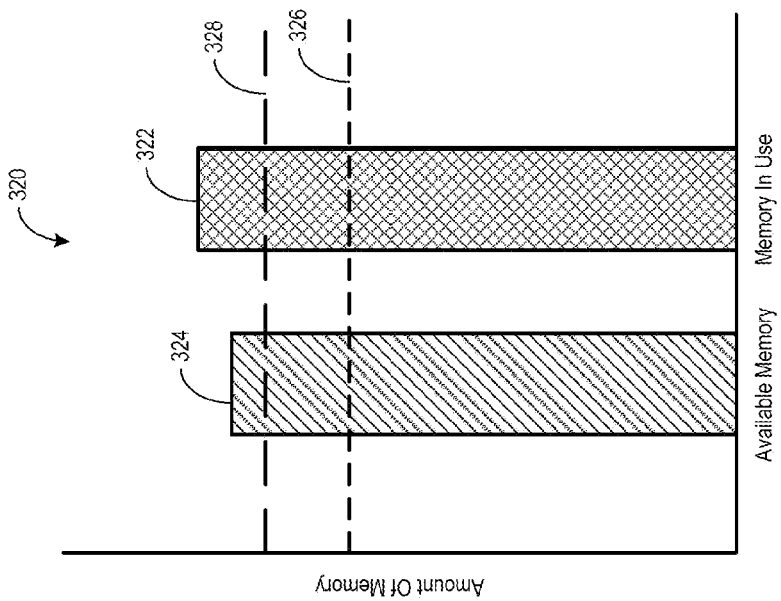
FIG. 5B illustrates a graph showing the memory usage of the proxy server in FIG. 5A.
Figure 5A:
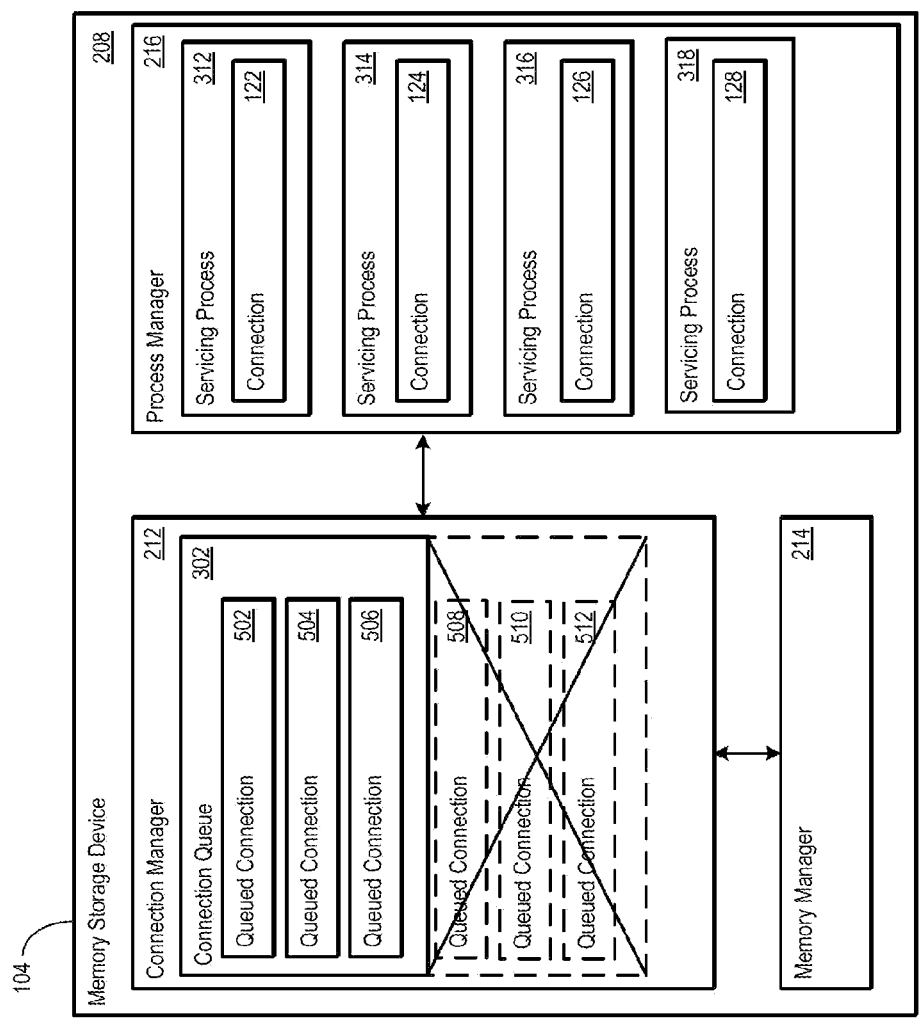
FIG. 5A illustrates one example of a proxy server operative to terminate a predetermined number of queued connections.

Although the proxy server 104 may be configured to incrementally increase the connection service amounts, the proxy server 104 may also be configured to terminate or refuse one or more connections. FIGS. 5A-5B illustrate an exemplary situation in which the proxy server 104 may terminate and/or refuse one or more connections. Initially, the proxy server 104 may be servicing connections 122-128 via the servicing processes 312-318. In addition, the proxy server 104 may have queued connections 502-512 such that that the connection queue 302 has no available connection slots. FIG. 5B may represent the memory usage of this exemplary situation.

As shown in FIG. 5B, the available memory amount 324 is less than the allocated memory amount 322. Accordingly, the memory pressure amount is greater than the memory pressure threshold amount 326. Moreover, the memory pressure amount is equal to, or greater than, the memory threshold amount 328. When the predetermined time interval lapses, the proxy server 104 may receive a request to establish a connection, or another condition occurs, and then the memory manager 214 and/or the connection manager 212 may take corrective or preventive steps to ensure that the proxy server 104 does not become unstable and/or to prevent service disruptions with the client devices 114-120.

In one implementation, the memory manager 214 may decrease the connection serviceable amount in response to the memory pressure amount being equal to, or greater than, the memory threshold amount 322. The memory manager 214 may decrease the connection serviceable amount by a connection decrease amount, such as by one connection, two connections, or any other connection amount. Alternatively, the memory manager 214 may determine the connection decrease amount. In one implementation, the memory manager 214 determines the connection decrease amount by dividing the memory threshold amount by the memory pressure amount to obtain a first result, and then multiplying this first result by the current connection queue amount to obtain a final result. As previously discussed above, the memory manager 214 may determine the current connection queue amount by querying the connection manager 212. Alternatively, the connection decrease amount may be a predetermined amount by which to decrease the connection serviceable amount, such as by 1 connection, 100 connections, or 1000 connections.

After obtaining this final result, the memory manager 214 may assign the connection serviceable amount as the final result. Where the connection decrease amount is a predetermined amount of connections, and the resulting adjusted connection serviceable amount is less than zero, the memory manager 214 may re-adjust the adjusted connection serviceable to be zero. Moreover, it is also possible that the adjusted connection serviceable amount is less than the connection serviceable amount. Where the adjusted connection serviceable amount is less than the connection serviceable amount, the connection manager 212 may decrease the connection queue limit by an equal or corresponding amount. Furthermore, to maintain proxy server stability, the connection manager 212 may terminate one or more queued connections 508-512 to correspond with the decrease in the connection queue limit. Additionally, the connection manager 212 and/or the memory manager 214 may request that the process manager 216 terminate the servicing of one or more connections should the termination of one or more queued connections 508-512 not be sufficient to drop the memory pressure amount below the memory threshold amount. By decreasing the connection queue limit, terminating one or more queued connections, and/or terminating one or more connections being serviced, the proxy server 104 ensures that it maintains stability while servicing the remaining connections and is more responsive to the actual performance of servicing connections rather than predictive or estimated performance.

In an alternative implementation, the proxy server 104 may not terminate queued connections 508-512 and/or connections being serviced 122-128 when the memory pressure amount exceeds the memory threshold amount 328. For example, the proxy server 104 may prefer to continue servicing connections being serviced 122-128 and/or maintaining the queued connections 508-512. In this implementation, after determining an adjusted connection serviceable amount, the memory manager 214 may compare the adjusted connection serviceable amount with the unadjusted connection serviceable amount. If the adjusted connection serviceable amount is less than, or equal to, the unadjusted connection serviceable amount and the unadjusted connection serviceable amount is not zero, the memory manager 214 may revert the adjusted connection serviceable amount back to the unadjusted connection serviceable amount. In this fashion, the memory manager 214 prevents the disruption of service with connections already established with the proxy server 104, but prevents the proxy server 104 from taking on additional connections until one or more of the connections have been serviced and/or terminated due to prolonged inactivity.

Figure 6:
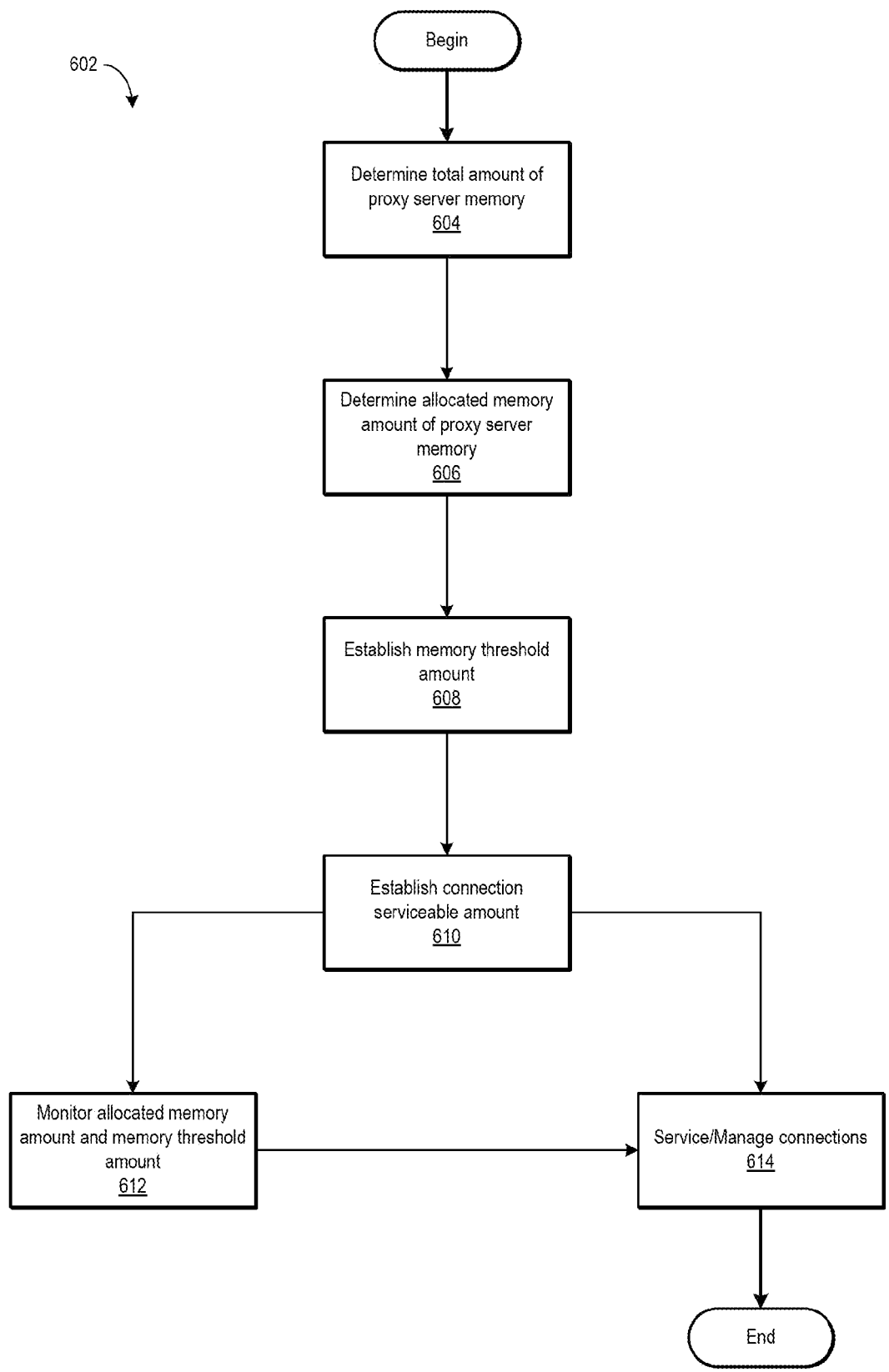
FIG. 6 illustrates one example of process flow of the proxy server for servicing and/or managing connections.

FIG. 6 illustrates one example of process flow 602 of the proxy server 104 for servicing and/or managing connections. The process flow 602 may include determining a total amount of proxy server memory, such as a memory capacity amount, of the proxy server 104 (604). The process flow 602 may further include determining an allocated memory amount of the proxy server memory (606) and establishing a memory threshold amount (608). As previously discussed, the memory manager 214 may be operative to determine and/or track the allocated memory amount of the proxy server 104. Moreover, the memory manager 214 may be operative to automatically determine the memory threshold amount or may receive input from another user or system to establish the memory threshold amount.

Based on the memory threshold amount, an available memory amount, the allocated memory amount, or a combination thereof, the memory manager 214 and/or the connection manager 212 may establish the connection serviceable amount (610). After establishing the connection serviceable amount, the memory manager 214 may then monitor the allocated memory amount and the memory threshold amount (612) and transmit one or more adjusted connection serviceable amounts to the connection manager 212 for additional handling. While the memory manager 214 is monitoring the allocated memory amount and the memory threshold amount, the connection manager 212 may be servicing and/or managing connections with the client devices 114-120, connections with the content distribution servers 106-112, or combinations thereof (614).

Figure 7:
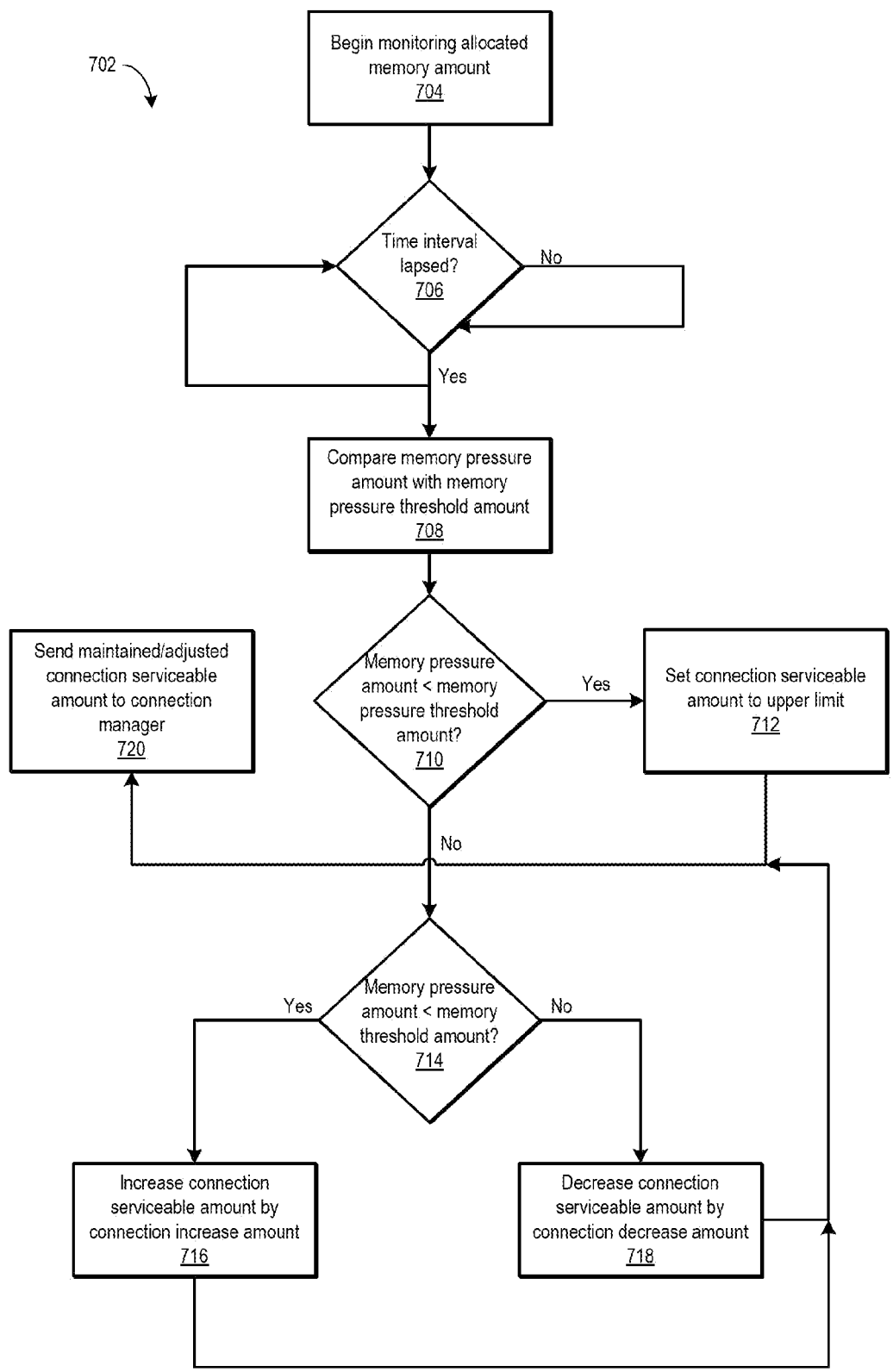
FIG. 7 illustrates one example of a process flow for managing memory of process flow shown in FIG. 6.

FIG. 7 illustrates one example of a process flow 702 for managing memory from the process flow 602 shown in FIG. 6. Initially, the memory manager 214 may be operative to begin monitoring the allocated memory amount (704). During the operation of the proxy server 104, the memory manager 214 may poll or query whether a predetermined time period or interval has lapsed (706). As mentioned above, the predetermined time period or interval may be any amount of time, such as 2.5 seconds. In another implementation of the process flow 702, the memory manager 214 may be operative to receive a memory allocation request from the connection manager 212 prior to, or instead of, the lapsing of the predetermined time interval.

Where the predetermined time period has lapsed, or where the memory manager 214 has received a memory allocation request from the connection manager 212, the memory manager 214 may then compare the memory pressure amount with the memory pressure threshold amount (708). The memory manager 214 may then determine whether the memory pressure amount is less than the memory pressure threshold amount (710). Alternatively, the memory manager 214 may compare the memory pressure amount with the memory threshold amount and determine whether the memory pressure amount is less than, or significantly less than, the memory threshold amount.

Should the memory pressure amount be less than the memory pressure threshold amount, the memory manager 214 may adjust the connection serviceable amount to a predetermined upper limit amount (712). As mentioned before, the upper limit amount may be any amount of connections, such as 1 connection, 100 connections, 1000 connections, or an unlimited number of connections. In addition, the memory manager 214 may adjust the connection serviceable amount when the memory pressure amount is equal to the memory pressure threshold amount.

However, the memory manager 214 may determine that the memory pressure amount is not less than the memory pressure threshold amount. In this situation, the memory manager 214 may determine whether the memory pressure amount is less than the memory threshold amount (714). Where the memory pressure amount is less than the memory threshold amount, but not less than the memory pressure threshold amount, the memory manager 214 may increase the connection serviceable amount by a predetermined connection increase amount (716). As mentioned before, the predetermined connection increase amount may be any amount connections, such as 1 connection, 100 connections, or any other number of connections. In addition, the memory manager 214 may adjust the connection serviceable amount when the memory pressure amount is equal to the memory pressure threshold amount.

It is possible that the memory pressure amount is not less than memory threshold amount and, in other words, that the memory pressure amount is greater than the memory threshold amount. Where the memory manager 214 determines that the memory pressure amount is greater than the memory threshold amount, the memory manager 214 may adjust, or decrease, the connection serviceable amount by a connection decrease amount (718). As mentioned before, the memory manager 214 may determine the connection decrease amount based on the current queue limit of the connection queue 302, or the connection decrease amount may be a predetermined amount by which to decrease the connection serviceable amount. Moreover, and depending upon the implementation of the memory manager 214, the memory manager 214 may also determine whether the adjusted connection serviceable amount is less than zero or less than the current connection serviceable amount. Furthermore, the memory manager 214 may adjust, such as by decreasing, the connection serviceable amount when the memory pressure amount is equal to the memory threshold amount.

After performing the determinations set out in the process flow 702, the memory manager 214 communicates the adjusted connection serviceable amount to the connection manager 212 (720). However, the memory manager 214 may communicate an adjusted connection serviceable amount that is equal to the connection serviceable amount prior to the lapsing of the predetermined time interval. For example, the connection serviceable amount may have been set to the upper limit amount and, after the memory manager 214 performs its operations, the adjusted connection serviceable amount may also be set to the upper limit amount. In this situation, the memory manager 214, in effect, may send a maintained connection serviceable amount to the connection manager 212.

Figure 8:
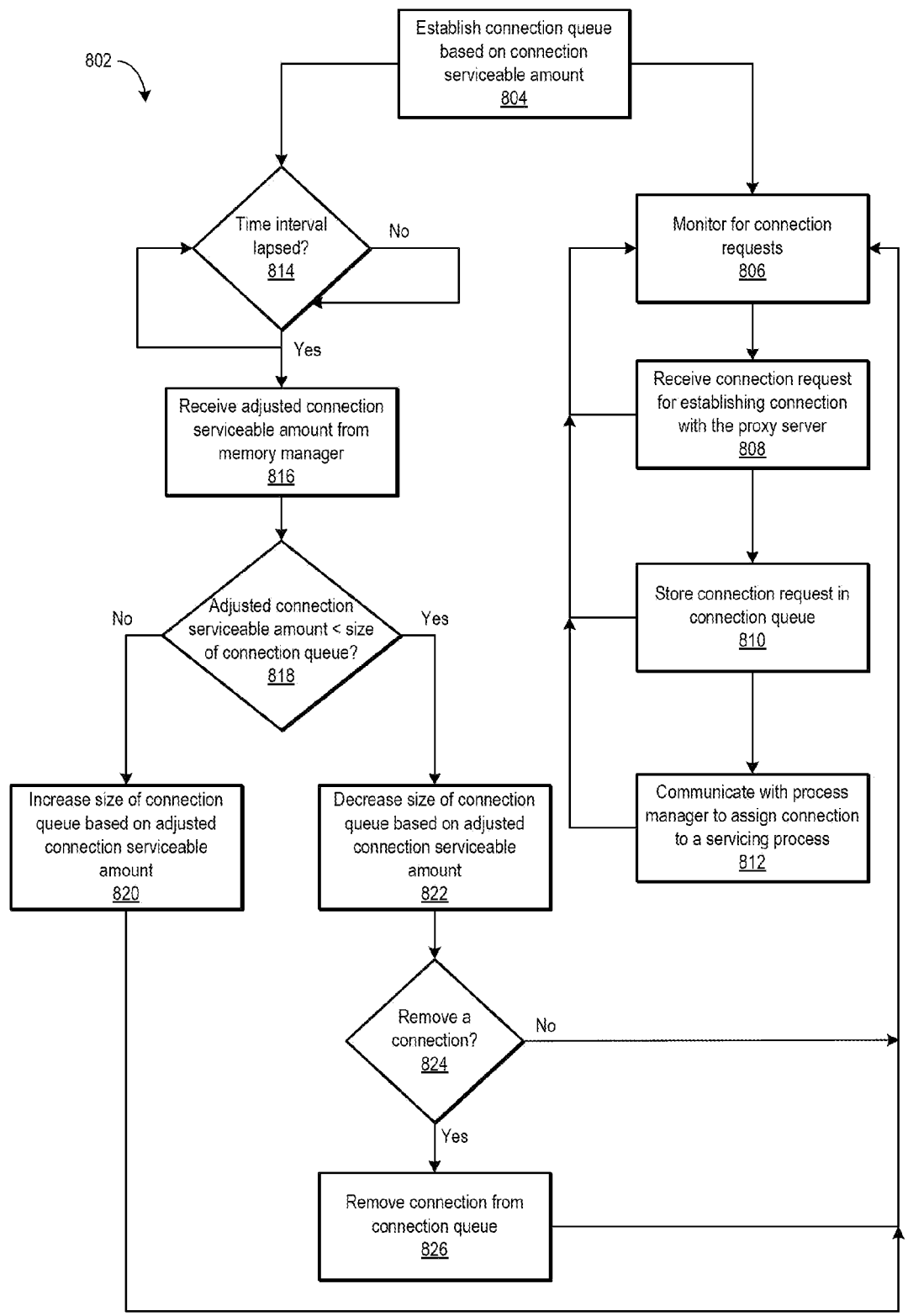
FIG. 8 illustrates one example of a process flow for managing a connection queue for the process flow shown in FIG. 6.

FIG. 8 illustrates one example of a process flow 802 for managing the connection queue 302 for the process flow 602 shown in FIG. 6. Initially, the connection manager 212 may establish the connection queue limit amount based on an initial connection serviceable amount (804). The connection manager 212 may then begin monitoring for incoming connections from one or more client devices (806). Alternatively, the connection manager 212 may also begin monitoring for incoming connections from one or more content distribution servers.

As the connection manager 212 is monitoring for connection requests, the connection manager 212 may receive a connection request for establishing a connection with the proxy server 104 (808). In response to the connection request, the connection manager 212 may send an acknowledgement to the requester of the connection request, and then place the connection request in the connection queue 302 (810). Alternatively, the connection manager 212 may inquire with the memory manager 214 whether the proxy server 104 has memory available to place the connection request in the connection queue 302, or inquire with the memory manager 214 whether the proxy server 104 has memory available to service the connection. As mentioned before, should the proxy server 104 not have the resources available to place the connection request in the connection queue 302, the connection manager 212 may reject and/or terminate the connection request.

After storing the connection request in the connection queue 302, the connection manager 212 may periodically inquire with the process manager 216 as to whether a servicing process is available to service the connection associated with the connection request (812). When a servicing process becomes available, the connection manager 212 may communicate with the process manager 216 so as to assign a servicing process to the connection associated with the connection request. As mentioned before, when the servicing process begins servicing the connection, the connection may be alternately transferred between the connection manager 212 and the process manager 216 as the connection alternates between idle and active states.

While the connection manager 312 is monitoring for incoming connections, the connection manager 312 may also determine whether the predetermined time interval has lapsed (814). When the predetermined time interval has lapsed, the connection manager 212 may then receive an adjusted (or maintained) connection serviceable amount from the memory manager 214 (816). Should the connection manager 212 not receive an adjusted or maintained connection serviceable amount after the predetermined time period has lapsed, the connection manager 212 may communicate with the memory manager 214 to determine whether an error has occurred and, if so, may log the error for later review.

After receiving the adjusted or maintained connection serviceable amount, the connection manager 212 may determine whether the adjusted connection serviceable amount is less than or greater than the current queue limit amount (818). Where the connection serviceable amount is maintained, and possibly, equal to the current queue limit amount, the connection manager 212 may not adjust the queue limit amount of the connection 302.

However, where the adjusted connection serviceable amount is different than the current queue limit amount, the connection manager 212 may take one or more actions depending on whether the adjusted connection serviceable amount is less than or greater than the current queue limit amount. Where the adjusted connection serviceable amount is greater than the current queue limit amount, the connection manager 212 may increase the queue limit amount based on the adjusted connection serviceable amount (820). Increasing the queue limit amount may include determining a difference between the current queue limit amount and the adjusted connection serviceable amount or establishing the queue limit amount as the adjusted connection serviceable amount.

Alternatively, where the adjusted connection serviceable amount is less than the current queue limit amount, the connection manager 212 may decrease the queue limit amount based on the adjusted connection serviceable amount (822). Decreasing the queue limit amount may include determining a difference between the current queue limit amount and the adjusted connection serviceable amount or establishing the queue limit amount as the adjusted connection serviceable amount. Moreover, the connection manager 212 may determine whether to terminate (remove) a queued connection should the adjusted queue limit amount be less than the current queue limit amount (824). Should the adjusted queue limit amount be less than the current queue limit amount, the connection manager 212 may terminate (remove) one or more queued connections (826). As mentioned before, the memory manger 214 and the connection manager 212 may also communicate with the process manager 216 to terminate one or more connections being serviced in order to decrease the memory pressure amount. However, it is also possible that the connection manager 212 and the process manager 216 are also operative to not terminate a queued connections or connections being serviced in order to maintain server stability.

In yet another implementation of the connection manager 212, the connection manager 212 establishes the connection queue limit amount based on the adjusted connection serviceable amount, regardless of whether the adjusted connection serviceable amount is greater than, less than, or equal to the current queue limit amount. In this implementation, the connection manager 212 primarily relies on the memory manager 214 to ensure that a queued connection or a connection being serviced is not inadvertently terminated.

The systems, components, and logic described above may be implemented in many different ways, including a combination of hardware and software, or as software for installation on any desired operating system including Linux, UNIX, or Windows. The functionality may be implemented in a single system or functionally partitioned across multiple systems. As another example, the components, systems, and logic may be implemented as computer-executable instructions or as data structures in memory and may be stored on, distributed across, or read from many different types of machine-readable media. The machine-readable media may include RAM, ROM, hard disks, floppy disks, CD-ROMs, flash memory or other machine-readable medium. The components, systems and logic may also be encoded in a signal, such as a signal received from a network or partitioned into sections and received in multiple packets communicated across a network.

The systems may be implemented in software, hardware, or a combination of software and hardware. The systems may be implemented in a computer programming language, such as C++, C#, or Java, or any other computer programming language now known or later developed.

Furthermore, the systems may be implemented with additional, different, or fewer components. As one example, a processor or any other logic or component may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems.

Logic, such as programs or circuitry, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

Moreover, one or more networks may be implemented as any combination of networks. A network may be a WAN, such as the Internet; a LAN; a PAN, or a combination of WANs, LANs, and PANs. Moreover, a network may involve the use of one or more wired protocols, such as SOAP; wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of network protocol now known or later developed.

Interfaces between the systems and the logic and modules within systems may be implemented in numerous ways. For example, interfaces between systems may be Web Services, SOAP, or Enterprise Service Bus interfaces. Other examples of interfaces include message passing, such as publish/subscribe messaging, shared memory, and remote procedure calls.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims. Furthermore, while certain operations and functions are shown in a specific order, they may be performed in a different order unless it is expressly stated otherwise.

The invention claimed is:

1. A system for dynamically managing user connections in a computer system, comprising:
   a memory storage device storing computer executable instructions; and
   one or more microprocessors in communication with the memory storage device, and when the computer-executable instructions are executed, configured to:
      establish a connection serviceable amount that represents a number of serviceable connections in a computer system;
      receive a first connection request for establishing a connection to the computer system;
      establish an allocated memory amount that represents a first amount of memory allocated by the computer system;
      establish a memory threshold amount that represents a threshold amount of memory allocated by the computer system;
      determine whether to accept a second connection request by comparing the allocated memory amount with the memory threshold amount;
      adjust the connection serviceable amount based on the comparing of the allocated memory amount with the memory threshold amount to obtain an adjusted connection serviceable amount; and
      adjust a queue limit of a connection queue based on the adjusted connection serviceable amount, the connection queue storing connections waiting to be serviced by the computer system.

2. The system of claim 1, wherein the one or more microprocessors are further configured to determine at a predetermined time interval whether to accept the second connection request.

3. The system of claim 1, wherein, when the one or more microprocessors receive a memory allocation request to allocate memory for the second connection request, the one or more microprocessors determine whether to accept the second connection request.

4. The system of claim 1, wherein adjusting the queue limit of the connection queue is performed by decreasing the queue limit when the allocated memory amount is greater than the memory threshold amount.

5. The system of claim 1, wherein adjusting the queue limit of the connection queue is performed by increasing the queue limit when the allocated memory amount is less than the memory threshold amount.

6. The system of claim 1, wherein the tone or more microprocessors are further configured to:

monitor the connection serviceable amount; and allocate memory for servicing connections to the computer system when a number of connections requesting service exceeds the connection serviceable amount.

7. The system of claim 1, wherein the adjusted connection serviceable amount is less than the connection serviceable amount when the allocated memory amount is greater than the memory threshold amount.

8. The system of claim 1, wherein:

the one or more microprocessors are further configured to establish a connection increase amount that represents an amount by which to increase the connection serviceable amount; and the adjusted connection serviceable amount represents the connection serviceable amount increased by the connection increase amount when the allocated memory amount is less than the memory threshold amount.

9. The system of claim 1, wherein:

the tone or more microprocessors are further configured to:
 establish an upper limit amount that represents an upper limit on the number of connections serviceable by the computer system;
 determine a memory pressure amount that represents a ratio of a second amount of memory allocated by the computer system to an amount of memory available to the computer system; and
 determine a memory pressure threshold amount that represents a threshold amount of memory pressure; wherein:
  the comparison of the allocated memory amount with the memory threshold amount is performed by comparing the memory pressure amount with the memory pressure threshold amount; and,
  the adjusted connection serviceable amount is assigned the upper limit amount when the memory pressure amount is less than the memory pressure threshold amount.

10. The system of claim 1, wherein:

the tone or more microprocessors are further configured to:
 establish a connection increase amount that represents an amount by which to increase the connection serviceable amount;
 determine a memory pressure amount that represents a ratio of a second amount of memory allocated by the computer system to an amount of memory available to the computer system;
 determine a memory pressure threshold amount that represents a threshold amount of memory pressure; and, wherein:
the comparison of the allocated memory amount with the memory threshold amount is performed by:
 comparing the memory pressure amount with the memory pressure threshold amount; and,
 comparing the memory pressure amount with the memory threshold amount; and,
the adjusted connection serviceable amount is the connection serviceable amount increased by the connection increase amount when:
 the memory pressure amount is greater than the memory pressure threshold amount; and,
 the memory pressure amount is less than the memory threshold amount.

11. A method for dynamically managing user connections in a computer system, comprising:

establishing, with one or more microprocessors, a connection serviceable amount that represents a number of serviceable connections in a computer system;

establishing, with the one or more microprocessors, an allocated memory amount that represents a first amount of memory allocated by the computer system;

establishing, with the one or more microprocessors, a memory threshold amount that represents a threshold amount of memory allocated by the computer system;

receiving, through a network interface, a first connection request for establishing a connection to a computer system;

determining, with the one or more microprocessors, whether to accept a second connection request by comparing the allocated memory amount with the memory threshold amount; and, adjusting, with the one or more microprocessors, the connection serviceable amount based on the comparing of the allocated memory amount with the memory threshold amount to obtain an adjusted connection serviceable amount; and adjusting, with the one or more microprocessors, a queue limit of a connection queue based on the adjusted connection serviceable amount, the connection queue storing connections waiting to be serviced by the computer system.

12. The method of claim 11, wherein determining, with the one or more microprocessors, whether to accept the second connection request occurs at a predetermined time interval.

13. The method of claim 11, wherein determining, with the one or more microprocessors, whether to accept the second connection request occurs when a memory allocation request is received to allocate memory for the second connection request.

14. The method of claim 11, wherein adjusting the queue limit of the connection queue comprises decreasing the queue limit of the connection queue when the allocated memory amount is greater than the memory threshold amount.

15. The method of claim 11, further wherein adjusting the queue limit of the connection queue comprises increasing the queue limit of the connection queue when the allocated memory amount is less than the memory threshold amount.

16. The method of claim 11, further comprising:

monitoring, with the one or more microprocessors, the connection serviceable amount; and transmitting a memory allocation request to allocate memory for servicing connections to the computer system when a number of connections requesting service exceeds the connection serviceable amount.

17. The method of claim 11, further comprising obtaining, with the one or more microprocessors, the adjusted connection serviceable amount is less than the connection serviceable amount when the allocated memory amount is greater than the memory threshold amount.

18. The method of claim 11, further comprising:

establishing, with the one or more microprocessors, a connection increase amount that represents an amount by which to increase the connection serviceable amount; and, wherein:

the adjusted connection serviceable amount represents the connection serviceable amount increased by the connection increase amount when the allocated memory amount is less than the memory threshold amount.

19. The method of claim 11, further comprising:

establishing, with the one or more microprocessors, an upper limit amount that represents an upper limit on the number of connections serviceable by the computer system;

determining, with the one or more microprocessors, a memory pressure amount that represents a ratio of a second amount of memory allocated by the computer system to an amount of memory available to the computer system;

determining, with the one or more microprocessors, a memory pressure threshold amount that represents a threshold amount of memory pressure; and, wherein:
the comparison of the allocated memory amount with the memory threshold amount is performed by comparing the memory pressure amount with the memory pressure threshold amount; and, the adjusted connection serviceable amount is assigned the upper limit amount when the memory pressure amount is less than the memory pressure threshold amount.

20. The method of claim 11, further comprising:
establishing, with the one or more microprocessors, a connection increase amount that represents an amount by which to increase the connection serviceable amount;
determining, with the one or more microprocessors, a memory pressure amount that represents a ratio of a second amount of memory allocated by the computer system to an amount of memory available to the computer system;
determining, with the one or more microprocessors, a memory pressure threshold amount that represents a threshold amount of memory pressure; and,
wherein:
the comparison of the allocated memory amount with the memory threshold amount is performed by:
comparing the memory pressure amount with the memory pressure threshold amount; and,
comparing the memory pressure amount with the memory threshold amount; and,
the adjusted connection serviceable amount is the connection serviceable amount increased by the connection increase amount when:
the memory pressure amount is greater than the memory pressure threshold amount; and,
the memory pressure amount is less than the memory threshold amount.

21. A non-transitory computer readable medium having computer-executable instructions stored thereon, the computer-executable instructions that, when executed by one or more computer processors, cause the one or more computer processors to perform a method comprising:
establishing a connection serviceable amount that represents a number of serviceable connections in a computer system;
establishing an allocated memory amount that represents a first amount of memory allocated by the computer system;
establishing a memory threshold amount that represents a threshold amount of memory allocated by the computer system;
receiving a first connection request for establishing a connection to a computer system;
determining whether to accept a second connection request by comparing the allocated memory amount with the memory threshold amount;
adjusting the connection serviceable amount based on the comparing of the allocated memory amount with the memory threshold amount to obtain an adjusted connection serviceable amount; and, adjusting a queue limit of a connection based on the adjusted connection serviceable amount, the connection queue storing connections waiting to be serviced by the computer system.

22. The non-transitory computer readable medium of claim 21, wherein determining whether to accept the second connection request occurs at a predetermined time interval.

23. The non-transitory computer readable medium of claim 21, wherein determining whether to accept the second connection request occurs when a memory allocation request is received to allocate memory for the second connection request.

24. The non-transitory computer readable medium of claim 21, wherein adjusting the queue limit of the connection queue comprises decreasing the queue limit when the allocated memory amount is greater than the memory threshold amount.

25. The non-transitory computer readable medium of claim 21, wherein adjusting the queue limit of the connection queue comprises increasing the queue limit when the allocated memory amount is less than the memory threshold amount.

26. The non-transitory computer readable medium of claim 21, wherein the method further comprises:
monitoring the connection serviceable amount; and
transmitting a memory allocation request to allocate memory for servicing connections to the computer system when a number of connections requesting service exceeds the connection serviceable amount.

27. The non-transitory computer readable medium of claim 21, wherein the adjusted connection serviceable amount is less than the connection serviceable amount when the allocated memory amount is greater than the memory threshold amount.

28. The non-transitory computer readable medium of claim 21, wherein the method further comprises:
establishing a connection increase amount that represents an amount by which to increase the connection serviceable amount; and, wherein:
the adjusted connection serviceable amount represents the connection serviceable amount increased by the connection increase amount when the allocated memory amount is less than the memory threshold amount.

29. The non-transitory computer readable medium of claim 21, wherein the method further comprises:
establishing an upper limit amount that represents an upper limit on the number of connections serviceable by the computer system;
determining a memory pressure amount that represents a ratio of a second amount of memory allocated by the computer system to an amount of memory available to the computer system;
determining a memory pressure threshold amount that represents a threshold amount of memory pressure; and,
assigning the memory pressure amount as the allocated memory amount when the memory manager establishes the allocated memory amount; wherein:
the comparison of the allocated memory amount with the memory threshold amount comprises comparing the memory pressure amount with the memory pressure threshold amount; and,
the adjusted connection serviceable amount is assigned the upper limit amount when the memory pressure amount is less than the memory pressure threshold amount.

30. The non-transitory computer readable medium of claim 21, wherein the method further comprises:

establishing a connection increase amount that represents an amount by which to increase the connection serviceable amount;

determining a memory pressure amount that represents a ratio of a second amount of memory allocated by the computer system to an amount of memory available to the computer system;

determining a memory pressure threshold amount that represents a threshold amount of memory pressure; and, assigning the memory pressure amount as the allocated memory amount when the memory manager establishes the allocated memory amount; wherein:

the comparison of the allocated memory amount with the memory threshold amount comprises:

comparing the memory pressure amount with the memory pressure threshold amount; and, comparing the memory pressure amount with the memory threshold amount; and, the adjusted connection serviceable amount is the connection serviceable amount increased by the connection increase amount when:

the memory pressure amount is greater than the memory pressure threshold amount; and, the memory pressure amount is less than the memory threshold amount.

\* \* \* \* \*